United States Patent [19]
Bolander et al.

[11] Patent Number: 5,090,382
[45] Date of Patent: Feb. 25, 1992

[54] VEHICLE ENGINE IGNITION TIMING SYSTEM WITH ADAPTIVE KNOCK RETARD

[75] Inventors: William J. Bolander, Clarkston; Larry T. Nitz, Troy, both of Mich.

[73] Assignee: Saturn Corporation, Troy, Mich.

[21] Appl. No.: 601,075

[22] Filed: Oct. 23, 1990

[51] Int. Cl.⁵ .............................................. F02P 5/14
[52] U.S. Cl. ................................................. 123/425
[58] Field of Search ........................ 123/425, 416, 419

[56] References Cited

U.S. PATENT DOCUMENTS

| | | | |
|---|---|---|---|
| 4,274,379 | 6/1981 | Iwata et al. | 123/425 |
| 4,328,779 | 5/1982 | Hattori et al. | 123/416 |
| 4,452,206 | 6/1984 | Haraguchi et al. | 123/425 |
| 4,811,714 | 3/1989 | Akasu | 123/425 |
| 4,819,603 | 4/1989 | Morita et al. | 123/425 |
| 4,867,124 | 9/1989 | Javabarian | 123/425 |
| 4,899,711 | 2/1990 | Tabara et al. | 123/475 |
| 4,969,439 | 11/1990 | Scotson | 123/419 |
| 4,981,124 | 1/1991 | Sallner et al. | 123/425 |

Primary Examiner—Raymond A. Nelli
Attorney, Agent, or Firm—Robert M. Sigler

[57] ABSTRACT

An ignition timing system generates ignition timing pulses from a basic ignition timing, a current knock retard and an adaptive knock retard. It includes a plurality of memory cells in a one-dimensional lookup table referenced to predetermined engine speeds and determines the adpative knock retard by multiplying a number derived from the cells at the current engine speed by a load gain factor based on current engine load. It updates the cells on a fixed time period basis. When sufficient knock has occurred in a time period, an increase is applied to the one or more cells closest to the engine speed at which knock first occurred during the period, with the amount of increase based on the maximum current knock retard during the period. Thus, updating is frequent and may occur even in transient conditions; and the correction is focused on the engine speed at which knock was initiated so as to prevent such knock initiation in the future.

6 Claims, 6 Drawing Sheets

VEHICLE ENGINE IGNITION TIMING SYSTEM WITH ADAPTIVE KNOCK RETARD

BACKGROUND OF THE INVENTION

This invention relates to an ignition timing system for a spark ignited vehicle engine and particularly to such a system utilizing a closed loop knock feedback control. Such systems generally provide knock correcting ignition retard in response to sensed knock in order to maintain knock at trace levels. Because knock can appear suddenly, the knock feedback control is designed with a high gain to provide a fast response. Therefore, the system is calibrated with an open loop ignition timing close to the actual expected ignition timing in order to reduce the size of the required feedback correction.

However, it is recognized that engines vary and change with age and wear and that other knock affecting conditions such as ambient temperature and humidity change unpredictably. These changes are generally slow compared to the speed required for the knock feedback control; so the prior art suggests adaptive ignition timing systems. In adaptive ignition timing systems, a set of memory cells stores adaptive ignition correction numbers as a function, typically, of engine speed and load, which numbers may be altered in engine operation. Each ignition timing calculation involves looking up a permanent calibrated ignition timing number from non-alterable memory and a correction number from alterable memory, both on the basis of an engine operating condition defined as a two-dimensional array based on engine speed and load ranges. These numbers are combined such as by addition, and the total is corrected for other engine operating parameters, including current knock from the fast knock feedback control.

The alterable cells are updated periodically, at a rate slow compared with the knock feedback control, on the basis of knock sensed since the last update. In the general manner of adaptive controls, a cell is not usually updated during transient conditions. A typical requirement is that a cell will not be updated unless the engine has operated at the engine speed and load ranges defining that cell for a predetermined minimum time. This determines which cell will be updated and promotes stability of adaptive learning. However, this means that adaptive learning or updating may be concentrated in stable modes of engine operation in which knock is relatively uncommon, with learning only rarely taking place in other, more transient, modes in which knock is much more common. Furthermore, the number of cells requiring updating can be relatively large with a two-dimensional (engine speed/load) lookup table. For example, a simple three-by-three lookup table includes nine cells. The more cells there are to update, the slower will be the updating process applied to the entire table and the more likely that some cells will go for a long time without being updated.

SUMMARY OF THE INVENTION

This invention is an improved ignition timing system of the type including an adaptive retard. It uses alterable memory cells for the storage of updatable numbers for an adaptive knock retard; but these numbers are stored as a one-dimensional lookup table referenced only to engine speed, with engine load used as a multiplying load gain. Thus, a far smaller number of cells (by comparative example: three) are required, which provides for faster updating of each cell.

In addition, when updating or learning takes place, the ignition timing system of this invention does not require a long period of engine operation in an engine operating condition range corresponding to one of the cells before the cell is updated. Rather, a cell may be updated even as the speed is changing across cell boundaries. The cell to be updated is chosen by the speed at which knock is first sensed, although the amount of change in the cell is based on the maximum knock retard during the update period, even if this occurs at an engine speed corresponding to a different cell. This is based on the observation that knock can be prevented with less retard than is required to suppress it after it starts. Therefore, a system that correctly anticipates and corrects knock provides more efficient engine operation, since ignition retard from MBT reduces power and fuel economy. In order to prevent the initiation of knock, the cell updating is focused on the engine speed at which knock is initiated. In this way, an adaptive ignition timing system may be used in transient engine operating modes.

However, the cell updating is not totally confined to the cell in which knock is initiated. There is a set of engine speed gains stored for each cell as a function of engine speed which equals one for the speed of that cell and lesser numbers for the other cells. In this way, cell updating will provide the maximum change in the cell closest to the engine speed at which knock first occurs but will also provide smaller changes in the other cells, with the size of change decreasing with increasing distance from the engine speed at which knock was first sensed. This provides a "rubber sheet" effect in which a correction at a particular point provides proportional changes nearby analogous to the behavior of a flexible membrane when poked in one spot. This helps prevent isolation of learning into engine operating condition compartments and speeds the response of the system.

Further details and advantages of the invention will be apparent from the accompanying drawings and following description of a preferred embodiment.

SUMMARY OF THE INVENTION

DESCRIPTION OF THE PREFERRED EMBODIMENT

Figure 1:
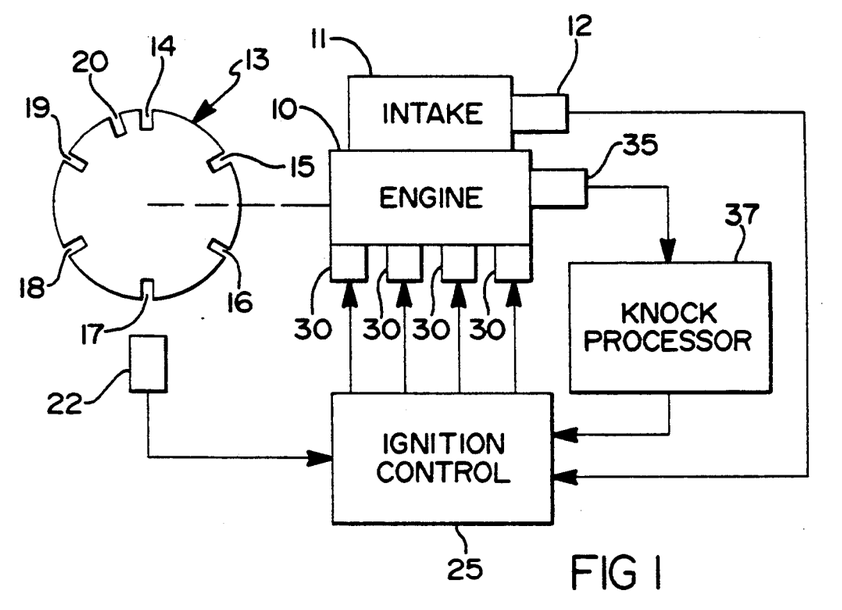
FIG. 1 is a block diagram of a vehicle engine including an ignition timing system according to the invention.

Referring to FIG. 1, an internal combustion engine 10 includes fuel intake apparatus 11 having a load sensor 12. Fuel intake apparatus 11 may be a carburetor or fuel injection system and includes an intake manifold to route the fuel charges to the various combustion chambers of the engine. Load sensor 12 may be responsive to engine vacuum or manifold absolute pressure to provide an analog electric voltage comprising the engine load signal. Engine 10 further comprises a disk 13 formed as part of the crankshaft of engine 10 having six slots 14–19 spaced 60 degrees apart rotationally and a seventh slot 20 spaced 10–20 degrees rotationally from slot 14. A magnetic or optic pickup 22 is responsive to the passage of each of slots 14–20 as disk 13 rotates with the crankshaft of engine 10 to generate crankshaft position indicating pulses from slots 14–19 and a synchronizing pulse from slot 20. Slots 14 and 17, 180 degrees apart, are so located as to indicate top dead center (TDC) of the combustion chambers of a four cylinder engine with slot 20, adjacent slot 14, indicating cylinders 1 and 3.

The pulses from pickup 22 and engine load signal from sensor 12 are provided to an ignition control 25 which fires spark plugs 30 in proper order and at optimum times in the operation of engine 10. Typically cylinders 1 and 3 are fired together alternating with cylinders 2 and 4 fired together, but only one cylinder fired at any given time has an ignitable fuel charge. Ignition control 25 may comprise a digital computer including a central processing unit (CPU), input/output (I/O) apparatus, memory including RAM and ROM which includes a stored program and standard bus, clock, addressing and synchronizing apparatus. The computer of ignition control 25 is effective to generate ignition timing signals in response to the inputs from sensor 12, pickup 22 and other sensors as appropriate in accordance with a portion of a stored program embodying the ignition control algorithm for the engine. Ignition control 25 further comprises an ignition power circuit, including ignition coils, responsive to the ignition timing signals from the computer to generate and output high voltage ignition pulses to spark plugs 30, one of which is provided for each of the four cylinders or combustion chambers of engine 10. A basic description of the system may be found in the 1987 Grand Am Service Manual published by the Pontiac Division of General Motors Corporation.

Figure 2:
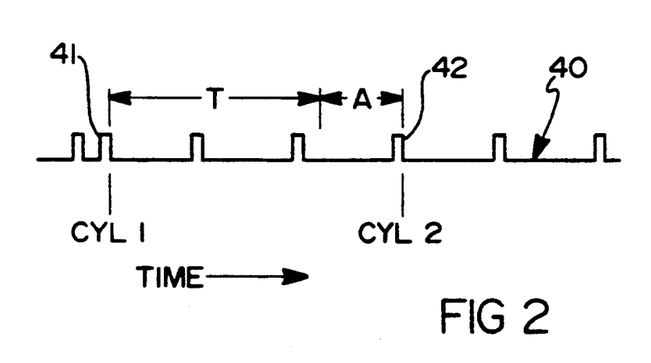
FIG. 2 is a waveform useful in understanding the operation of the engine of FIG. 1.

In operation, ignition control 25 receives pulses from pickup 22 in a waveform 40 as shown in FIG. 2 and measures the intervals between successive pulses from pickup 22. From these intervals, ignition control 25 identifies the pulses occurring at TDC of the cylinders, such as pulse 41 for cylinder 1, pulse 42 for cylinder 2 and other pulses, not shown, for cylinders 3 and 4 in four cylinder engine 10. In order to fire the spark plug of cylinder 2 with an advance relative to TDC of cylinder 2, the ignition timing signal of cylinder 2 is timed from the earlier occurring TDC of cylinder 1. With reference to FIG. 2, a spark advance "A" relative to TDC of cylinder 2 is produced by delaying the ignition timing signal for cylinder 2 by a time corresponding to crank angle "T" after TDC of cylinder 1. Since the engine speed is changeable with respect to the clock timing of the ignition control, the latter uses engine speed determined from the time periods between pulses from slots 14–19 to determine and adjust the time period corresponding to crank angle "T" in a manner known in the art.

Engine 10 is further provided with a knock sensor 35, which may be any vibration or other sensor known in the art for producing a signal of a knock related engine parameter. Sensor 35 provides an output signal to a knock processor 37 which substantially reduces the noise in the signal of sensor 35 and generates a knock signal when knock occurs. The knock signal output of knock processor 37 may be in the form of a count in a counter which is increased in response to each identified knock event or condition.

Ignition control 25 derives ignition timing in a manner described with reference to the flow chart of FIG. 3: DERIVE IGNITION TIMING. This flow chart describes a subroutine or other portion of the engine control program which repeats every 12.5 milliseconds. In step 80, a basic advance is derived from engine speed, load and other sensed operating parameters as is well known to those skilled in the art. For example, the basic timing may be a value derived from a lookup table in ROM referenced in a two-dimensional array of engine speed and load parameters, the engine speed parameter derived from the time durations between pulses from pickup 22 and slots 14–19 in disc 13 and the engine load parameter derived from sensor 12. The actual value of the basic timing may be further modified by other engine operating parameters such as engine coolant temperature, fuel composition, etc. This basic timing may be expressed for convenience in degrees after TDC of the previous firing cylinder. In step 81, this value is corrected for current knock based on the output of knock processor 37. This step is shown in greater detail in the flowchart of FIG. 10: CORRECT FOR CURRENT KNOCK.

Figure 10:
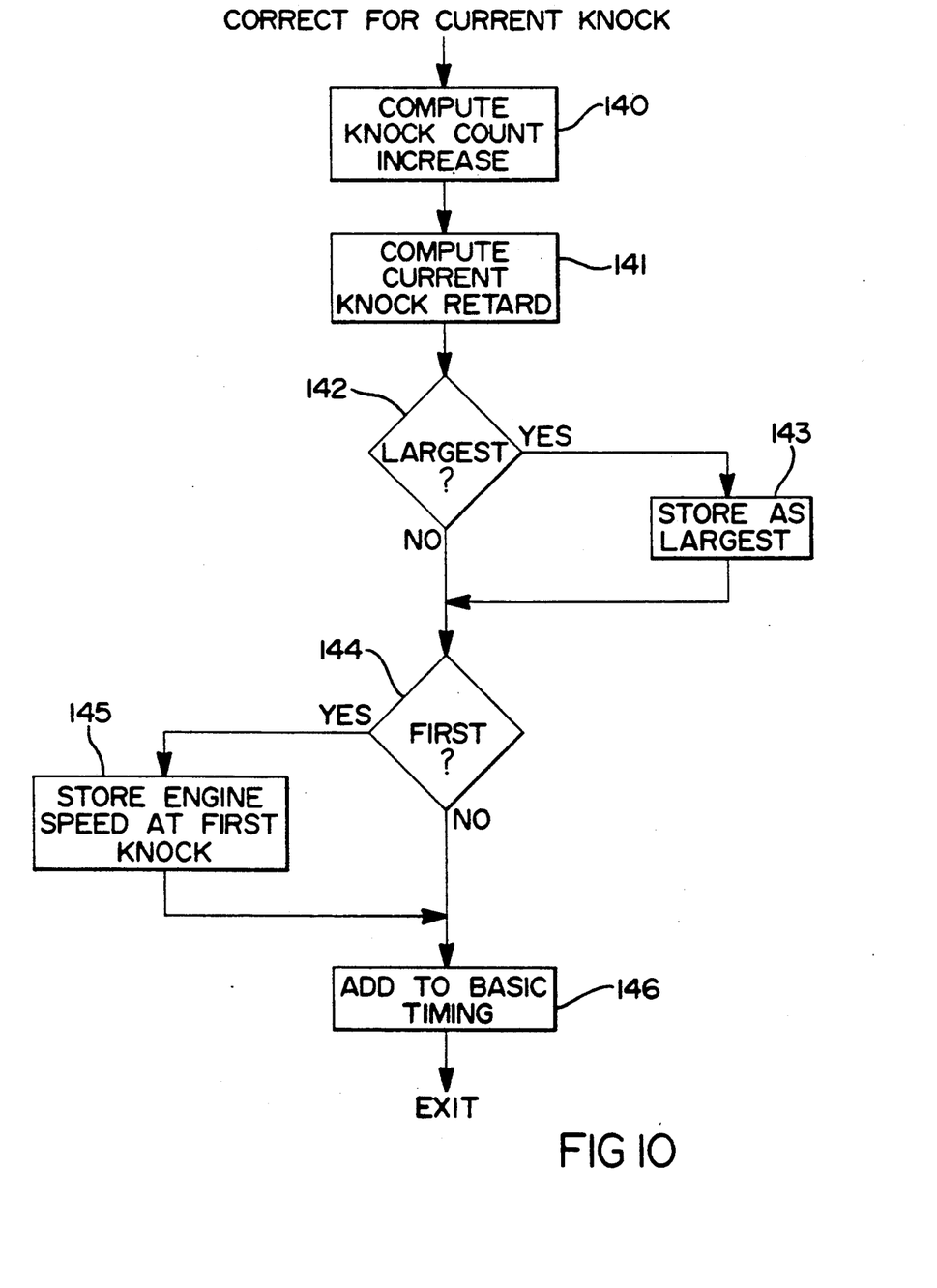

Referring to FIG. 10, the knock count increase for the last 12.5 millisecond cycle is computed in step 140. This may be accomplished by reading the knock counter of knock processor 37 and subtracting the similar count from the last cycle stored in RAM. When the current knock indicating difference has been computed, the new count replaces the prior count in RAM for use as the old count on the next cycle. The count difference is then used to compute the current knock retard in step 141. Generally, the difference may be adjusted by one or more gain or scaling factors, which might be based on some engine operating parameter such as engine speed, and added to a previously computed and stored current knock retard from the previous cycle. If there has been no knock since the previous cycle, the current knock retard may be unchanged; and if there has been no knock for some longer predetermined time, a constant reduction factor may be adjusted by similar gains or scaling factors and subtracted from the stored current knock retard from the previous cycle. In this way, the current knock retard may be increased upward quickly in response to knock and decreased more slowly in the absence of knock.

Figure 7:
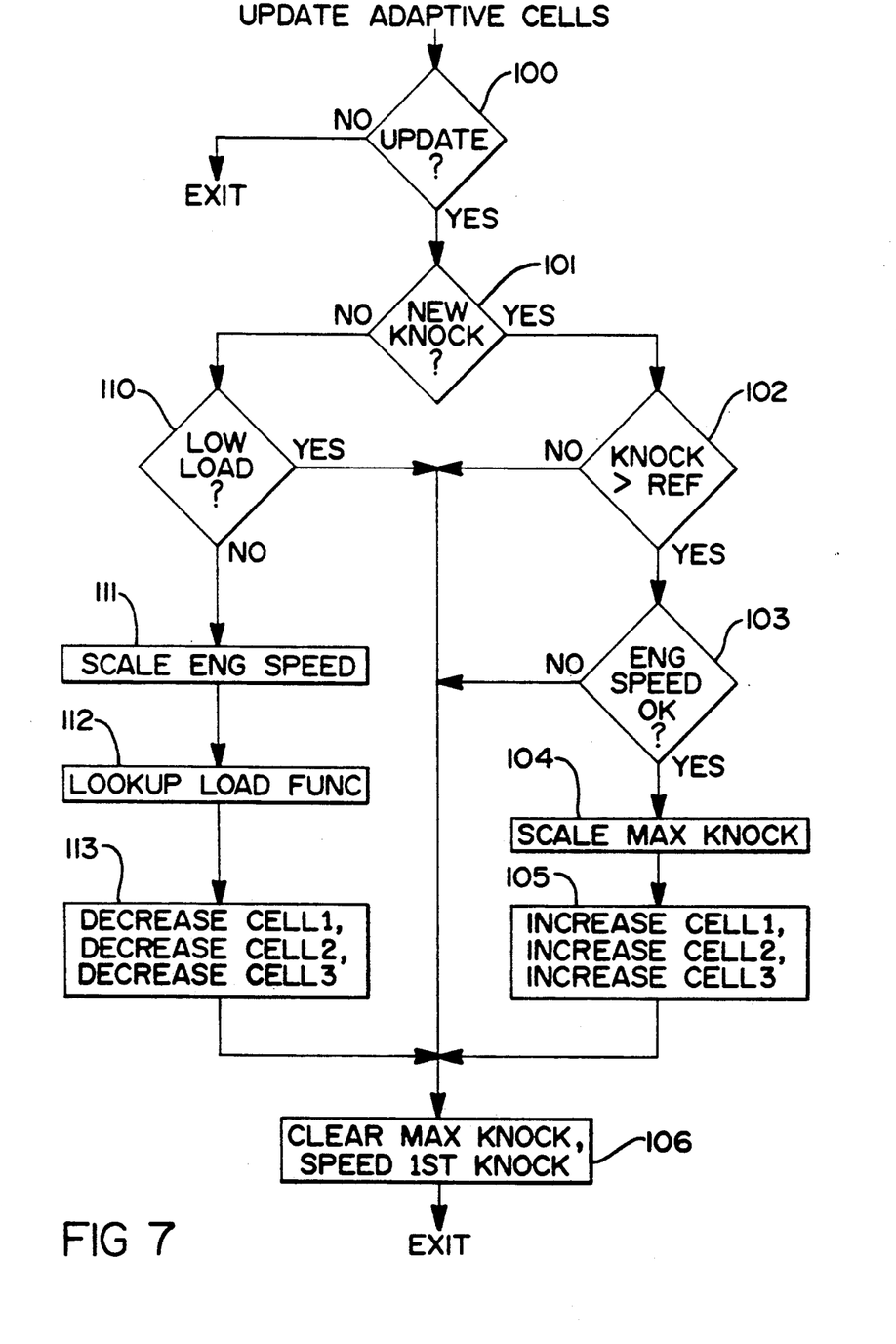
FIGS. 7, 8, 9 and 10 are flowcharts further describing the operation of the ignition timing system of this invention.

When the new current knock retard has been computed, it is compared at decision point 142 with the largest previous value stored in a memory location in RAM. If it is larger, it replaces the former largest value in that memory location at step 143. This will continue for a longer period comprising a predetermined number of cycles of this subroutine until the value is used and cleared, as will be described at a later point in connection with FIG. 7.

Next, it is determined at decision point 144 whether this cycle produced the first sensed knock event of the longer period just mentioned. This may be accomplished with a first knock flag. When a change in the knock counter occurs with this flag reset, the engine speed, or a scaled version thereof, is stored, in step 145, in a memory location as the speed of first sensed knock and the flag is set to prevent further changes in the memory location until after the flag is again reset at the end of the longer period. Finally, the current knock retard is added at step 146 to the basic timing to form a current knock corrected ignition timing.

Figure 3:
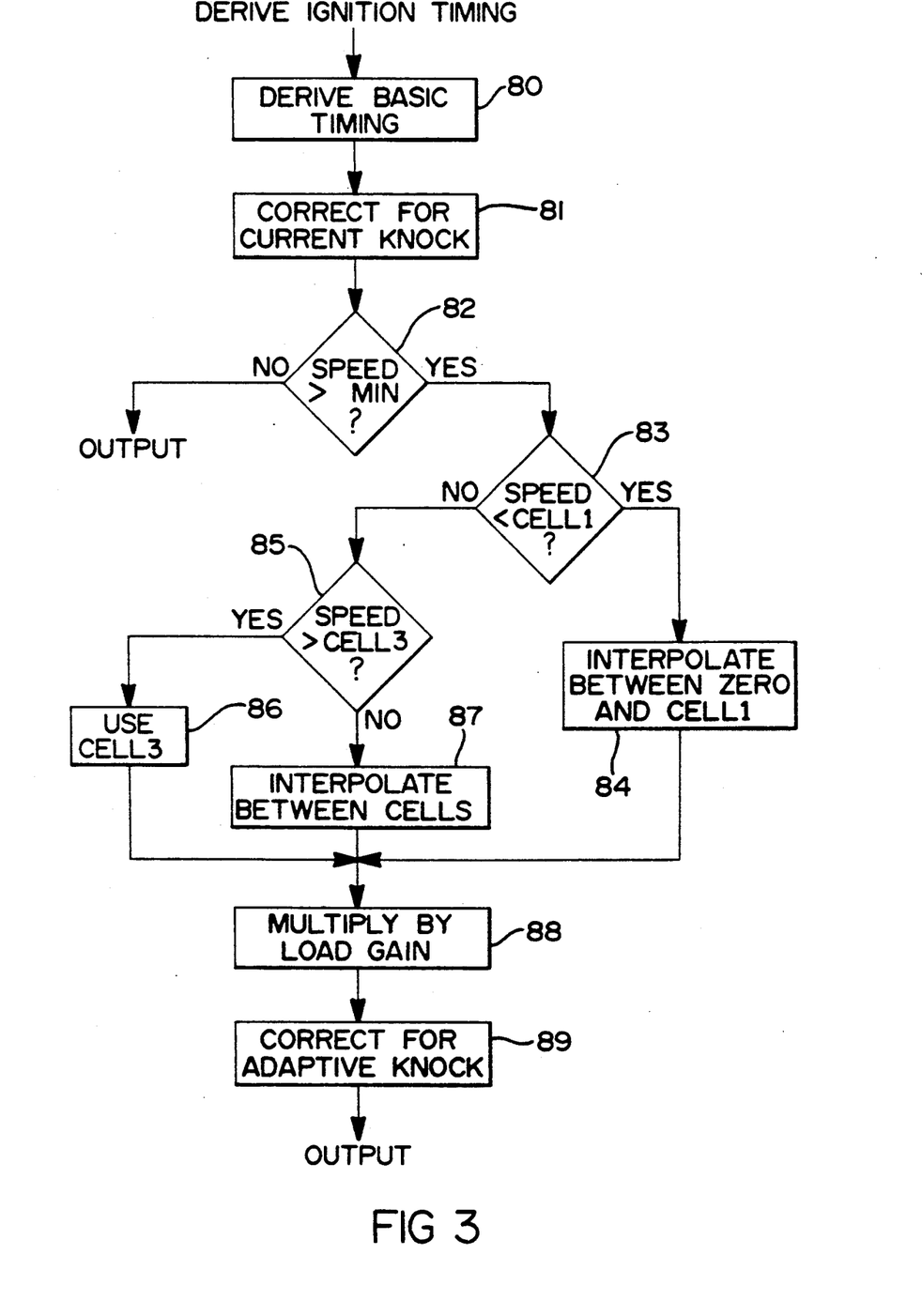
FIG. 3 is a flowchart describing part of the operation of the ignition system of this invention.
Figure 4:
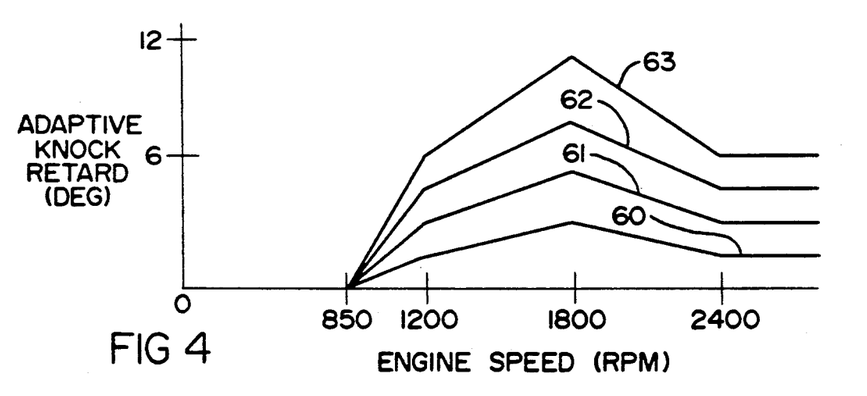
FIGS. 4, 5 and 6 show graphs useful in understanding the operation of the ignition timing system of the invention.
Figure 5:
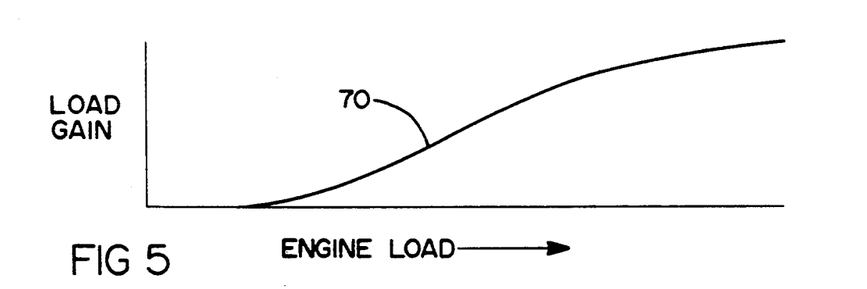

Ignition control 25 further current knock corrected ignition timing with an adaptive knock retard derived as shown in the remainder of the flow chart of FIG. 3 and the curves of FIGS. 4 and 5. At decision point 82, the engine speed is compared with MIN, a minimum engine speed for adaptive knock correction. MIN is close to idle speed: for example 850 RPM, since adaptive knock retard is not used in cranking or idle. If engine speed is not greater than MIN, there is no adaptive knock correction; and the current knock corrected ignition timing is output as the ignition timing. However, if engine speed exceeds MIN (850 RPM), an adaptive knock retard will be derived from the contents of one or more of three adaptive retard cells in the RAM of ignition control 25. Each of these cells comprises a pair of 8-bit bytes and is thus capable of storing a 16 bit number which may be updated periodically at a slower rate, such as every 200 milliseconds, by ignition control 25, so that the system may learn knock affecting variations in fuel, environmental operating parameters such as temperature and humidity, and changes due to system aging. In this embodiment, three such cells are used, each occupying two eight-bit bytes; and each cell is associated with a predetermined engine speed. CELL1 corresponds to 1,200 RPM; CELL2 corresponds to 1,800 RPM; and CELL3 corresponds to 2,400 RPM. Although the engine may be capable of 6,000-7,000 RPM top engine speed, most knock occurs in the lower engine speed range; and, for optimal resolution and control, the adaptive knock cells are concentrated in this range.

If engine speed is greater than 850 RPM, at decision point 83 the engine speed is compared with the speed corresponding to CELL1: 1,200 RPM. If it is less than 1,200 RPM, it must be between MIN and CELL1; and a preliminary adaptive retard value is derived in step 84 by linear interpolation between zero (value at 850 RPM) and the number in CELL1. If the engine speed is not less than that of CELL1, it is compared at decision point 85 with the speed of CELL3. If it is greater than CELL3, the number in CELL3 is looked up in step 86 for use as the preliminary adaptive retard value. If the engine speed is not greater than that of CELL3, it must be between that of CELL1 and CELL3; and the preliminary adaptive retard value is determined in step 87 by linear interpolation between cells. In greater detail, an engine speed of exactly 1,200, 1,800 or 2,400 RPM would provide a value of the number in CELL1, CELL2 or CELL3, respectively; an engine speed between 1,200 and 1,800 RPM would be interpolated between the numbers in CELL1 and CELL2; and an engine speed between 1,800 and 2,400 RPM would be interpolated between the numbers in CELL2 and CELL3.

When the engine speed dependent preliminary adaptive retard value is derived as explained above, it is multiplied in step 88 by a load gain derived from the sensed engine load. The general form of the variation of the load gain with engine load is shown by curve 70 in FIG. 5: generally it increases with engine load. It may be stored as a set of numbers in a lookup table addressed with engine load and derived with interpolation. The product of the preliminary adaptive knock retard value and the load gain is the adaptive knock retard, the variation of which with engine speed and load is shown by curves 60-63 in FIG. 4. Curves 60-63 are derived with increasing values of engine load; and each is zero in the engine speed range up to 850 RPM, increases linearly from zero in the engine speed range 850-1,200 RPM and changes in connected linear segments in the engine speed ranges 1,200-1,800 RPM and 1,800-2,400 RPM. Above 2,400 RPM, each is horizontal. A quite comprehensive series of curves can be obtained from the three engine speed cell values and the load gain. The adaptive retard is added to the current knock corrected basic timing in step 89 to produce the ignition timing for output. This value, scaled for engine speed, may be used with a counter referenced to the appropriate TDC pulse to generate an ignition timing signal at the desired moment so as to fire the appropriate spark plug.

The adaptive cells CELL1, CELL2 and CELL3 are updated in a separate subroutine every 200 milliseconds. This subroutine is described with reference to FIG. 7: UPDATE ADAPTIVE CELLS. First, it is determined at decision point 100 whether to update the cells. This may involve a number of decisions. For example, if the subroutine is actually running at a faster repetition rate, it must be determined whether 200 milliseconds has elapsed from the last update. In addition, certain malfunctions—such as knock sensor not connected or too much retard for the current speed/load condition—should not be present. The engine should not be cold, since a cold engine makes more noise and knock sensing may not be accurate. Finally, the battery voltage should not be low. If any of these requirements are not met, the subroutine is exited; and no updating will take place. If all requirements are met, however, it is determined at decision point 101 whether there was new knock in the previous 200 milliseconds. This may be determined by examining the first knock flag mentioned above: if it is reset, there has been no new knock for the entire 200 millisecond period. If there was new knock, the maximum knock retard determined during the previous 200 milliseconds is compared at decision point 102 with a threshold value REF. If this value is insufficient, no updating will take place. Likewise, if engine speed is not within an allowed range, as determined at decision point 103, no updating will take place. However, if the maximum knock retard exceeds REF and the speed range is OK, the maximum retard is scaled in step 104 by subtracting the minimum knock retard REF and multiplying by a constant; and an INCREASE CELLX subroutine is called three times in step 105, once each for CELL1, CELL2 and CELL3, respectively.

Figure 6:
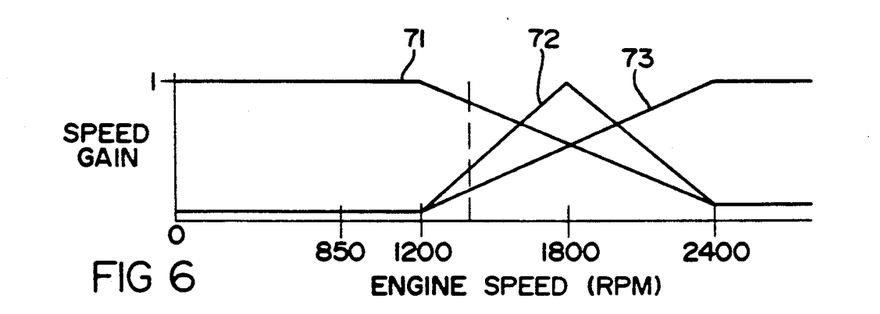
Figure 8:
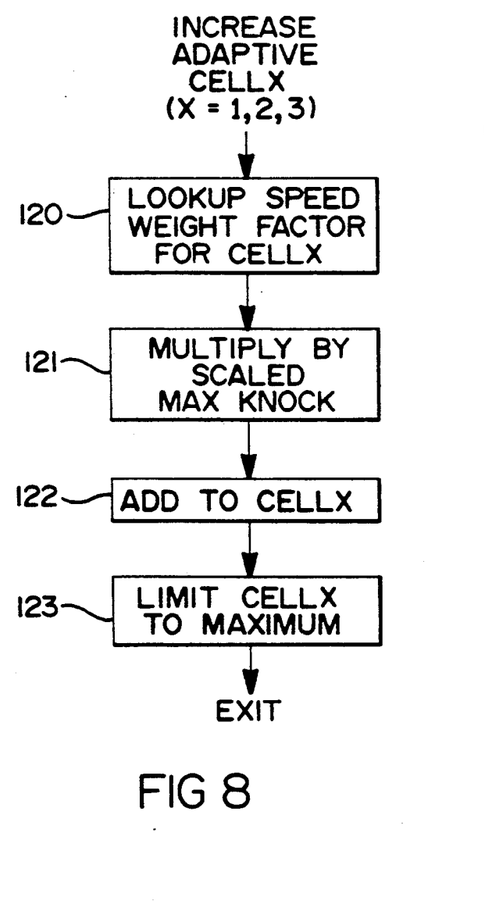

The INCREASE CELLX subroutine is described in the flow chart of FIG. 8. First, at step 120, a speed weight factor for CELLX is looked up in a ROM lookup table for the appropriate cell on the basis of engine speed. The speed weight factors for CELL1, CELL2 and CELL3 are shown as curves 71, 72 and 73, respectively in FIG. 6. The purpose of the speed weight factors is to provide an appropriate contribution to each cell from a knock at a given speed. For example, assuming the engine speed used for present updating is 1,400 RPM, as shown by the vertical dashed line in FIG. 6, the weighting factor for CELL1 would be the largest (about 0.8), the weighting factor for CELL2 would be somewhat less (about 0.4) and that for CELL3 would be the smallest (about 0.2). The weighting factor for a speed corresponding to a cell is 1.0 for that cell. The use of the speed weight factors produces updating of each cell by an amount decreasing with the distance of the engine speed corresponding to that cell from the engine speed used for the update. The effect is similar to the poking of a "rubber sheet" in one spot, with the surrounding area also moving, though not as much.

The engine speed used for increasing cells is the engine speed at the occurrence of first knock in the previous 200 millisecond period. This is based on the observation that it requires more retard to stop knock, once started, than it does to prevent its start. Therefore, the system is designed to update the cells by applying the speed weighting factors based on the engine speed of first knock while basing the correction on the maximum retard for the period, even if the maximum retard occurred at a different engine speed. The latter may occur, since engine speed may be changing quickly. However, focusing the correction on the engine speed of first knock is found to help prevent the initiation of knock. As already explained, the engine speed of first knock is stored in a RAM location and is available for use in this subroutine.

Likewise, it is desired to adjust the size of the adaptive increase according to the severity of the sensed knock in order to reduce the size of future current knock retards. The maximum knock retard is also available, as previously explained, in a RAM location. Thus, the maximum The speed weighting factor for the engine speed of first knock is multiplied by the scaled maximum knock in step 121 and added to the contents of the cell in step 122, with the cell contents being limited to a maximum in step 123 before the subroutine is exited. Since the subroutine is called for each cell, all three cells are updated, with the relative size of the increase varying with the speed weighting factor. Returning to step 106 of the flowchart of FIG. 7, the RAM location storing the maximum knock retard from the previous 200 millisecond period is cleared to zero and the first knock flag is reset in order to set up the next adaptive update before the subroutine is exited.

Figure 9:
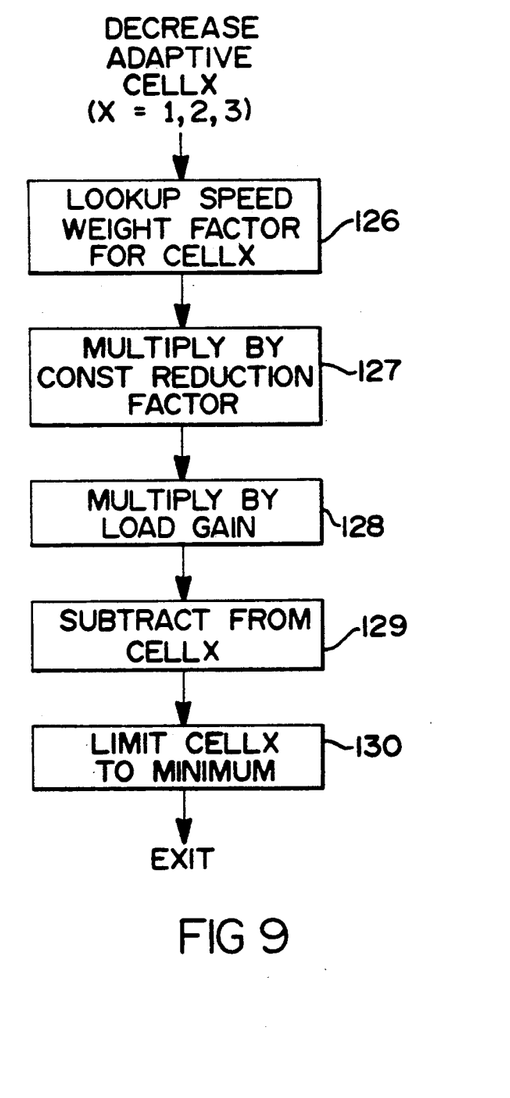

If no new knock is found at decision point 101, it is determined at decision point 110 if the engine load has been greater than a minimum value for a predetermined time. If not, no updating takes place. If so, however, the engine speed is scaled in step 111. Although the engine speed at the beginning of knock is used for increasing cell contents, the present engine speed (at the end of the 200 millisecond period) is used to decrease cell contents, since there isn't any knock and therefore no speed of first knock. In step 112 the engine load gain is looked up in a ROM table as a function of the present engine speed. With the scaled engine speed and load gain established, the DECREASE CELLX subroutine is called for CELL1, CELL2 and CELL3 in step 113. This subroutine is shown in the flowchart of FIG. 9. In step 126, the speed weight factor, as previously described for the INCREASE CELLX subroutine, is looked up for the present engine speed and appropriate cell. Next, this factor is multiplied in step 127 by a constant reduction factor which sets the basic adaptive retard reduction rate. In step 128 the product from step 127 is multiplied by the load gain so that retard is learned out slower at low loads. The product of step 128 is subtracted from the contents of CELLX in step 129 and the contents are limited to a minimum in step 130. Returning to the flowchart of FIG. 7, step 106 follows step 113 before the subroutine is exited. It should be noted that step 106 is performed before the subroutine is exited even when no updating occurs due to the failure of conditions in decision points 102, 103 or 110, so as to set up the next update (200 millisecond) period. This is likewise true for decision point 100 except for the condition that 200 milliseconds has not yet passed.

The embodiments of the invention in which an exclusive property or privilege is claimed are defined as follows:

1. In a spark ignited vehicle engine having a plurality of combustion chambers with combustion ignition apparatus, an ignition timing system comprising, in combination:
   means for sensing knock in the combustion chambers and determining therefrom a current knock retard;
   memory means comprising a plurality of alterable cells referenced to engine speed;
   means for generating ignition timing signals at least in part from the contents of the cells referenced to the current engine speed;
   means for determining an engine speed at which knock is first sensed during a time period;
   means for determining a maximum value of the current knock retard during the time period; and
   means for updating one of the cells in a direction to retard the timing of the ignition signals, the one of the cells being updated in amount based on the maximum current knock retard in the time period and being referenced to the engine speed at which knock is first sensed during the time period.

2. The ignition timing system of claim 1 in which the plurality of alterable memory cells comprises a one-dimensional array referenced only to engine speed and the means for generating ignition timing signals stores and uses a stored engine load gain referenced to sensed engine load.

3. In a spark ignited vehicle engine having a plurality of combustion chambers with combustion ignition apparatus, an ignition timing system comprising, in combination:
   means for generating a basic ignition timing;
   means for sensing knock in the combustion chambers and determining therefrom a current knock retard;
   memory means comprising a plurality of cells in a one-dimensional lookup table referenced to engine speed;
   means for deriving an adaptive knock retard from the contents of the cells referenced to the current engine speed;
   means for generating ignition timing signals as arithmetic combinations of the basic timing, the current knock retard and the adaptive knock retard;
   means for determining an engine speed at which knock is first sensed during a time period;
   means for determining a maximum value of the current knock retard during the time period; and
   means for updating one of the cells in a direction to increase the adaptive knock retard in amount based on the maximum current knock retard in the time period, the one of the cells being referenced to the engine speed at which knock is first sensed during the time period.

4. The ignition timing system of claim 3 further comprising means for storing an engine load gain function and using a value of the load gain function based on sensed engine load in the derivation of the adaptive knock retard.

5. The ignition timing system of claim 3 in which the means for updating one of the cells is alternatively effective, if no knock is sensed in the time period, to update the one of the cells in a direction to decrease the adaptive knock retard in amount based on sensed engine load, the one of the cells being referenced to current engine speed.

6. The ignition timing system of claim 3 in which the means for updating the one of the cells stores a set of engine speed gains as a function of engine speed for each of the cells and updates each of the cells by an amount derived from one of the engine speed gains from the set of engine speed gains for that cell determined by the engine speed at which knock is first sensed during the time period.

* * * * *